US011893910B2

(12) United States Patent
Bartlein

(10) Patent No.: US 11,893,910 B2
(45) Date of Patent: Feb. 6, 2024

(54) AROMA FLAVOR

(71) Applicant: James L. Bartlein, Hudson, WI (US)

(72) Inventor: James L. Bartlein, Hudson, WI (US)

(73) Assignee: James L. Bartlein, Hudson, WI (US)

( * ) Notice: Subject to any disclaimer, the term of this patent is extended or adjusted under 35 U.S.C. 154(b) by 0 days.

(21) Appl. No.: 17/836,499

(22) Filed: Jun. 9, 2022

(65) Prior Publication Data

US 2022/0319356 A1 Oct. 6, 2022

Related U.S. Application Data

(63) Continuation of application No. 16/935,410, filed on Jul. 22, 2020, now Pat. No. 11,386,811.

(60) Provisional application No. 62/966,191, filed on Jan. 27, 2020, provisional application No. 62/879,775, filed on Jul. 29, 2019.

(51) Int. Cl.
*G09F 3/02* (2006.01)
*G09F 3/10* (2006.01)
*B65D 23/14* (2006.01)

(52) U.S. Cl.
CPC ........... *G09F 3/0288* (2013.01); *B65D 23/14* (2013.01); *G09F 3/10* (2013.01); *G09F 2003/028* (2013.01); *G09F 2003/0222* (2013.01); *G09F 2003/0229* (2013.01); *G09F 2003/0241* (2013.01); *G09F 2003/0269* (2013.01); *G09F 2003/0273* (2013.01)

(58) Field of Classification Search
CPC .. G09F 3/0288; G09F 3/10; G09F 2003/0222; G09F 2003/0229; G09F 2003/0241; G09F 2003/0269; G09F 2003/0273; G09F 2003/028; G09F 19/00; B65D 23/14; B65D 23/08; B65D 23/0807; B65D 23/0842; B65D 23/085; B65D 23/0871; B65D 23/0878
See application file for complete search history.

(56) References Cited

U.S. PATENT DOCUMENTS

| | | | |
|---|---|---|---|
| 3,409,181 A | 11/1968 | McDonnell | |
| 5,165,603 A | 11/1992 | Hahn | |
| 5,635,229 A | 6/1997 | Ray | |
| 6,045,833 A | 4/2000 | Landau | |
| D427,909 S | 7/2000 | Doritty et al. | |

(Continued)

FOREIGN PATENT DOCUMENTS

| | | | |
|---|---|---|---|
| EP | 1151926 A2 * | 11/2001 | ............ B65D 23/14 |
| EP | 1322344 B1 | 6/2006 | |

(Continued)

OTHER PUBLICATIONS

JPH07267272A Machine Translation via EPO.*

(Continued)

*Primary Examiner* — Laura C Powers
(74) *Attorney, Agent, or Firm* — Seager, Tufte & Wickhem LLP

(57) ABSTRACT

A user-selectable aromatic label for attachment to a beverage container may include a substrate, a scent layer including plurality of scent microcapsules arranged in one or more regions on the substrate, and a removable cover over the scent microcapsules. The removable cover may be selectively removed to rupture the scent microcapsules underneath.

21 Claims, 14 Drawing Sheets

(56) References Cited

U.S. PATENT DOCUMENTS

| | | | | |
|---|---|---|---|---|
| 6,095,033 | A | 8/2000 | Melton | |
| 6,102,224 | A | 8/2000 | Sun et al. | |
| 6,314,866 | B1 | 11/2001 | Melton | |
| D466,006 | S | 11/2002 | Wright | |
| 6,511,726 | B1 | 1/2003 | Kinigakis | |
| 7,005,152 | B2 | 2/2006 | Landau | |
| 7,748,557 | B2 | 7/2010 | Robinson | |
| 8,440,265 | B2 | 5/2013 | Duan | |
| 9,801,969 | B2 | 10/2017 | Griffis | |
| 9,944,433 | B2 | 4/2018 | Hamilton | |
| 9,968,209 | B2 | 5/2018 | Maranon | |
| D826,047 | S | 8/2018 | Griffis | |
| D827,435 | S | 9/2018 | Griffis | |
| 10,086,104 | B2 | 10/2018 | Griffis | |
| 10,328,172 | B2 | 6/2019 | Griffis | |
| 2002/0190023 | A1 | 12/2002 | Landau | |
| 2003/0224151 | A1 * | 12/2003 | Mitchell, Jr. | B41M 5/42 428/43 |
| 2004/0028779 | A1 | 2/2004 | Landau | |
| 2008/0083754 | A1 | 4/2008 | Robinson | |
| 2008/0193727 | A1 | 8/2008 | Bernstein | |
| 2010/0055245 | A1 | 3/2010 | Havekotte et al. | |
| 2010/0104715 | A1 | 4/2010 | Norris et al. | |
| 2010/0323134 | A1 | 12/2010 | Bostian et al. | |
| 2011/0155606 | A1 | 6/2011 | McKillip et al. | |
| 2013/0043245 | A1 | 2/2013 | Griffis | |
| 2016/0177141 | A1 | 6/2016 | Schroeyers et al. | |
| 2017/0050762 | A1 | 2/2017 | Hamilton | |
| 2018/0043047 | A1 | 2/2018 | Griffis | |

FOREIGN PATENT DOCUMENTS

| | | | | | |
|---|---|---|---|---|---|
| EP | 2542481 | B1 | | 7/2018 | |
| GB | 2409448 | B | | 11/2006 | |
| GB | 2534044 | A | | 7/2016 | |
| JP | H07-267272 | A | * | 10/1995 | |
| JP | H09034364 | A | | 2/1997 | |
| WO | 9964323 | A1 | | 12/1999 | |
| WO | WO-0112239 | A2 | * | 2/2001 | A45D 34/02 |
| WO | 2009102917 | A1 | | 8/2009 | |
| WO | 2010027969 | A1 | | 3/2010 | |
| WO | 2011043889 | A2 | | 4/2011 | |
| WO | 2011043889 | A3 | | 4/2013 | |
| WO | 2018111262 | A1 | | 6/2018 | |

OTHER PUBLICATIONS

EP1151926A2 Machine Translation via EPO.*

"Budweiser to put a label on all its beers brewed with renewably energy" (from Climate Action website, https://www.climateaction.org/news/budweiser-to-put-a-label-on-all-its-beers-brewed-with-renewable energy; Jan. 25, 2018; hereafter referred to as "Budweiser"). (Year: 2018).

Machine translation of JP H0934364 via EPO website.

* cited by examiner

AROMA FLAVOR

CROSS-REFERENCE TO RELATED APPLICATIONS

This application is a continuation of U.S. patent application Ser. No. 16/935,410, filed Jul. 22, 2020, which claims the benefit of priority under 35 U.S.C. § 119 to U.S. Provisional Application Ser. No. 62/879,775, filed Jul. 29, 2019, and U.S. Provisional Application Ser. No. 62/966,191, filed Jan. 27, 2020, the disclosures of which are incorporated herein by reference.

BACKGROUND

Flavor is an important contribution to the consumer's overall experience while enjoying food and/or beverages. However, there is a trend in the food and beverage industry to reduce or eliminate the use of flavoring and other added ingredients from food and beverages. Accordingly, it is desirable to enhance the consumer's enjoyment of food and beverages while reducing or eliminating the use of flavoring and other added ingredients from food and beverages.

SUMMARY

Aroma and visual references enhance the perception of flavor and play a significant role in flavor perception when enjoying a tasting experience. Aroma alone may stimulate the olfactory nerve creating the impression of taste in unflavored or lightly flavored food and beverages. When flavors are absent from the product and not actually tasted, aroma alone can provide a sense or perception of taste. Additionally, stimulating the optic nerve through a visual reference of indicia associated with a particular flavor, for example a visual image a food (e.g., fruit, chocolate, etc.) associated with a particular flavor, can also trigger the sense of taste by recalling a prior tasting experience. Accordingly, labels for use with food and/or beverage containers that trigger the sense of taste to provide a flavor enhancing experience are disclosed herein.

One illustrative embodiment is a user-selectable aromatic label. The label includes a substrate having a bottom surface and a top surface. The bottom surface includes an adhesive for adhering the label to a beverage container. A scent layer is disposed on the top surface of the substrate. The scent layer includes a plurality of scent microcapsules arranged in at least a first region and a second region. The plurality of scent microcapsules in the first region have a first scent and the plurality of scent microcapsules in the second region have a second scent different from the first scent. A removable cover is disposed over the scent layer. The removable cover includes a first panel covering the first region and a second panel covering the second region. The first and second panels of the removable cover are selectively and independently removable from the label without removing the other of the first and second panels. Removing one of the first and second portions of the removable cover ruptures the scent microcapsules underneath.

Alternatively or additionally, in another embodiment, the adhesive is a repositionable adhesive.

Alternatively or additionally, in another embodiment, the first region includes a first colorant and the second region include a second colorant different from the first colorant.

Alternatively or additionally, in another embodiment, the first region includes indicia indicative of the first scent and the second region includes indicia indicative of the second scent, the first indicia being different from the second indicia.

Alternatively or additionally, in another embodiment, the scent layer includes a third region of scent microcapsules having a third scent different from the first and second scents, and wherein the removable cover includes a third panel covering the third region.

Alternatively or additionally, in another embodiment, the cover is formed of a cellulose based material.

Alternatively or additionally, in another embodiment, the substrate, scent layer, and cover are all biodegradable.

Alternatively or additionally, in another embodiment, the label includes a concave edge. The concaved edge may be configured to permit the label to at least partially circumferentially surround a frustoconical neck region of a beverage bottle and/or permit the label to be applied to an upper surface of a beverage can opposite the opening of the beverage can without obstructing the opening of the beverage can.

Alternatively or additionally, in another embodiment, the substrate is provided on an elongated roll, wherein each of the first and second regions of the scent layer is arranged in a longitudinal strip along the roll.

Another embodiment includes a beverage container having the aromatic label described above disposed thereon with the aromatic label positioned adjacent an opening of the beverage container.

Alternatively or additionally, in another embodiment, the aromatic label extends circumferentially around a circumference of the opening.

Alternatively or additionally, in another embodiment, the opening of the beverage is provided in a top surface thereof, and the aromatic label is positioned on the top surface opposite the opening such that the aromatic label is position in close proximity to a consumer's nose when the consumer drinks from the beverage container.

Alternatively or additionally, in another embodiment, the top surface of the substrate further includes printed product identification information.

Another illustrative embodiment is a scent enhanced beverage container. The container is configured to hold a beverage and has an opening for drinking the beverage from. A user-selectable aromatic label is disposed on the container adjacent the opening. The aromatic label includes, a substrate, a scent layer, and a removable cover. The substrate is affixed to a surface of the container. The scent layer is disposed on the substrate. The scent layer includes at least a first scent region containing a plurality of scent microcapsules having a first scent and a second scent region containing a plurality of scent microcapsules having a second scent different from the first scent. The removable cover is disposed over the scent layer. The removable cover includes a first panel covering the first region and a second panel covering the second region. the first panel of the removable cover is selectively and independently removable from the first region of the scent layer to release the first scent while the second region remains covered by the second panel.

Alternatively or additionally, in another embodiment, the scent layer includes a third scent region containing a plurality of scent microcapsules having a third scent different from the first and second scents, wherein the removable cover includes a third panel covering the third region.

Alternatively or additionally, in another embodiment, the first region includes first indicia indicative of the first scent and the second region includes second indicia indicative of the second scent, the first indicia being different from the second indicia.

Alternatively or additionally, in another embodiment, the first region includes a first colorant indicative of the first scent and the second region includes a second colorant indicative of the second scent, the second colorant being different from the first colorant.

Alternatively or additionally, in another embodiment, the aromatic label is an annular label extending circumferentially around a frustoconical neck region of the container.

Alternatively or additionally, in another embodiment, the removable cover is formed of a cellulose based material.

Alternatively or additionally, in another embodiment, the removable cover includes a cut or score line between the first panel and the second panel.

Another illustrative embodiment is a roll of aromatic labels. The roll includes a continuous strip of material and a plurality of labels arranged along the continuous strip of material. Each label includes a scent layer and a removable cover disposed over the scent layer. Removal of the cover ruptures scent microcapsules in the scent layer to release a scent.

Alternatively or additionally, in another embodiment, a segment of the continuous strip of material forms a substrate of each of the plurality of labels.

Alternatively or additionally, in another embodiment, the continuous strip of material is a backing layer removable from an adhesive layer of the plurality of labels to expose the adhesive.

Alternatively or additionally, in another embodiment, the continuous strip of material includes a plurality of preferential tear lines alternating with the plurality of labels along a length of the continuous strip of material.

Alternatively or additionally, in another embodiment, the scent layer includes a first longitudinal strip having a plurality of scent microcapsules of a first scent and a second longitudinal strip having a plurality of scent microcapsules of a second scent, the second scent being different from the first scent.

Alternatively or additionally, in another embodiment, the cover includes a longitudinal score or cut dividing the cover into a first portion overlying the first longitudinal strip and a second portion overlying the second longitudinal strip.

Another illustrative embodiment is an aroma dispensing assembly comprising a container including a reservoir and a dispenser, the reservoir containing an aroma solution, and a plurality of absorbent labels, each label including a first side configured to absorb the aroma solution and a second side opposite the first side, the second side including an adhesive.

Alternatively or additionally, in another embodiment, the adhesive is repositionable and the plurality of absorbent labels are stacked one on top of another with second sides contacting first sides of adjacent absorbent labels.

Alternatively or additionally, in another embodiment, the aroma dispensing assembly further comprises a liquid impermeable barrier between the first side and the second side.

Alternatively or additionally, in another embodiment, the adhesive is pressure-sensitive.

Alternatively or additionally, in another embodiment, each absorbent label includes a first curved edge configured to fit around an opening in a beverage container.

Alternatively or additionally, in another embodiment, the beverage container is a can, and each absorbent label includes a second curved edge opposite the first curved edge, the second curved edge configured to match a curvature of an outer circular edge of a top surface of the beverage can.

Alternatively or additionally, in another embodiment, the dispenser is a spray nozzle.

Alternatively or additionally, in another embodiment, the dispenser is a rollerball.

Alternatively or additionally, in another embodiment, the aroma solution includes propylene glycol.

Alternatively or additionally, in another embodiment, the aroma solution includes alcohol.

Alternatively or additionally, in another embodiment, the aroma solution includes at least one essential oil.

Alternatively or additionally, in another embodiment, the aroma dispensing assembly further comprises a receptacle attached to the container, the receptacle configured to hold the plurality of absorbent labels.

Alternatively or additionally, in another embodiment, the receptacle is configured to dispense one absorbent label at a time.

Alternatively or additionally, in another embodiment, the receptacle extends circumferentially around the container.

Another illustrative embodiment is a method of enhancing a container of carbonated water comprising applying an aroma solution to an absorbent surface of a label, the label including an adhesive and adhering the label to a beverage container, the label adhered adjacent an opening of the container such that the absorbent surface is adjacent a consumer's nose while drinking from the container.

Alternatively or additionally, in another embodiment, adhering the label includes adhering the label such that it does not contact the consumer's mouth while drinking from the container.

Alternatively or additionally, in another embodiment, applying the aroma solution includes spraying the aroma solution from a spray bottle.

Alternatively or additionally, in another embodiment, prior to spraying the aroma solution, the method further comprises removing a single label from a container holding a plurality of labels, wherein the container is attached to the spray bottle.

Alternatively or additionally, in another embodiment, applying the aroma solution to the label and adhering the label are performed immediately prior to drinking from the container.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
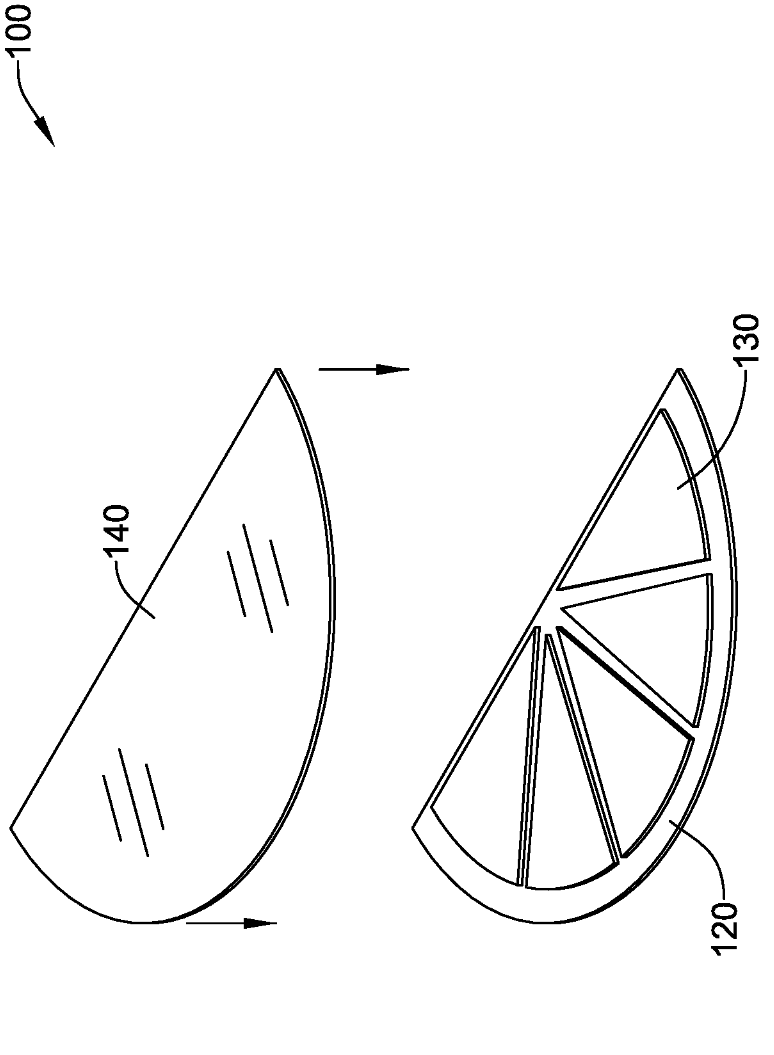
FIG. 1A is an illustration of an exemplary aromatic label with the cover removed.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5). Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. For simplicity and clarity purposes, not all elements of the disclosure are necessarily shown in each figure or discussed in detail below. However, it will be understood that the following discussion may apply equally to any and/or all of the components for which there are more than one, unless explicitly stated to the contrary. Additionally, not all instances of some elements or features may be shown in each figure for clarity.

Relative terms such as "top", "bottom", "upper", "lower", variants thereof, and the like, may be generally considered with respect to the positioning, direction, and/or operation of various elements relative to a user/operator/manipulator of the device.

The terms "monolithic" and "unitary" shall generally refer to an element or elements made from or consisting of a single structure or base unit/element. A monolithic and/or unitary element shall exclude structure and/or features made by assembling or otherwise joining multiple discrete elements together.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously-used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

The following description should be read with reference to the drawings, which are not necessarily to scale, wherein similar elements in different drawings are numbered the same. The detailed description and drawings are intended to illustrate but not limit the claimed invention. Those skilled in the art will recognize that the various elements described and/or shown may be arranged in various combinations and configurations without departing from the scope of the disclosure. The detailed description and drawings illustrate example embodiments of the claimed invention. However, in the interest of clarity and ease of understanding, while every feature and/or element may not be shown in each drawing, the feature(s) and/or element(s) may be understood to be present regardless, unless otherwise specified.

A trend in the food and beverage industry is clean label identity. Many consumers are demanding food and beverages with little or no added ingredients. For products like bottled water, consumers often prefer 100% water with no other added ingredients such as flavors or enhancers. However, those same consumers, while acknowledging that plain water is healthy, may find plain water unsatisfying to consume.

Visual and aromatic stimulation can significantly add to the enjoyment of plain water without adding flavors or other ingredients to the water. Water is just one example of a broad range of lightly flavored or unflavored food and beverages that would benefit from an aromatic label.

Another trend in the beverage industry is moving from plastic bottles to aluminum cans. Although most water bottles and other plastic beverage bottles are recyclable, a significant amount are disposed of in landfills instead of being recycled. Aluminum cans on the other hand carry a cash value and are recycled in far greater numbers. There is strong evidence that aluminum cans my soon replace most plastic beverage bottles. A common, multi-purpose label including an aromatic and/or visual representation of a flavor may be used for both beverages packaged in plastic bottles and aluminum cans. The use of a label that may be placed directly on the bottle or can has the advantages of being easy to manufacture and use by the consumer, as well as being environmentally friendly.

Aromatic and/or visual sensorial stimulation provides a greater organoleptic perception of flavor without actually adding flavors or other flavoring ingredients to food and beverages. Aromatic and/or visual sensorial stimulation may be achieved by providing the food or beverage container with a label that includes one or both of an aromatic component and a visual representation of a flavor.

Aromatic sensorial stimulation may be provided by encapsulating a liquid or gel aromatic substance that stimulates the olfactory system. For example, the aromatic substance may be a volatile compound such as an extract, oil, or fragrance. Oils derived from foods may include citrus oils such as orange, lemon, lime, grapefruit, tangerine, etc., or herb oils such as mint, anise, cinnamon, lemongrass, etc. Food derived extracts may include those desired by a consumer for enhancing the beverage, such as strawberry, blueberry, raspberry, blackberry, cherry, lemon, lime, watermelon, mango, coconut, pineapple, kiwi, passion fruit, apple, peach, melon, pear, pomegranate, grape, cucumber, etc. Combinations of oils and/or extracts may also be used to create numerous fragrant scent profiles that include a blend of two or more scents enhanced by perfume technology.

The aromatic substance may be provided with a label that can be applied to an outer surface of the beverage container in proximity to the opening of the container that is positioned close to the consumer's nose while drinking the beverage. While the encapsulated aromatic substance provides an aroma or scent to the label, the label may be devoid of any added flavoring configured to provide a taste if the label were to be licked. The label is positioned on the bottle or can such that the consumer's lips or tongue will not contact the label when the consumer drinks from the bottle or can.

Encapsulation or microencapsulation may be achieved by surrounding the liquid aromatic substance within a membrane or a matrix. Encapsulation is a process in which tiny particles or droplets are surrounded by an encapsulated coating to preserve the aroma. The resulting microcapsule is a small sphere with a uniform wall around it. The material inside the microcapsule can be referred to as the core, internal phase, or fill, whereas the wall may be referred to as a shell, coating, or membrane. The microcapsules may have diameters between a few micrometers and a few millimeters, for example. In some examples, an oil may be mixed with ethyl alcohol to form a slurry and encapsulated with a formaldehyde-free polymer using a process such as that performed by Encapsys® in Appleton, WI There are numerous ways to rupture the microencapsulated coating to release the core aroma. Mechanical shear release is one way. For example, a protective strip or cover may be fused to the surface of the encapsulated material. Removal of the strip or cover results in mechanical shear that ruptures the shell or membrane of the microcapsule, thereby releasing the aroma of the liquid aromatic substance.

One example of an aromatic label 100 is illustrated in FIG. 1A. The label 100 may include a base layer or substrate 120 on which a scented layer 130 of scent microcapsules encapsulated in a membrane or matrix is deposited, and a removable cover 140 that is disposed over the microcapsule encapsulated scented layer 130 until use. The scented layer 130 may contain at least one aromatic material, or a plurality of aromatic materials, if desired. The substrate 120 may be paper, paper board, cardboard, or other material that readily holds the scent microcapsules 130. The substrate 120 may be a single layer of material or a laminated structure of multiple layers of material in some instances. The substrate 120 has a bottom surface and a top surface opposite the bottom surface. The bottom surface, configured to face the beverage container, may include an adhesive, such as a pressure sensitive adhesive, for attaching the label 100 to the container. In some examples, the adhesive may be a repositionable adhesive. The scented layer 130, including the encapsulated microcapsules, may be deposited on and be in contact with the top surface of the substrate 120. The cover 140 may be removably attached to the top surface of the scented layer 130 such that removing (e.g., peeling off) the cover 140 from the scented layer 130 creates a mechanical shear that ruptures the scent microcapsules, releasing the aromatic material within the scent microcapsules of the scent layer 130. The aromatic material is prevented from being released merely by rubbing or scratching the label 100. This provides the advantage of the label 100 retaining the scent during shipment and handling of the label 100 and any container to which it is affixed. In some instances, the cover 140 may be transparent, allowing any indicia (e.g., images or markings) and/or color of the underlying portion of the label 100 (e.g., the scent layer 130) to be viewed through the cover 140 when the cover 140 is in place over the top surface of the scent layer 130.

The entire label 100 may be biodegradable, including the substrate 120, the scent layer 130, any dye included therein, and the removable cover 140. For example, the label 100 and its components may be made of plant-based materials. In some instances, the removable cover 140 may be formed of cellulose based materials, poly-lactic acid, poly vinyl alcohol, gelatin polymer, or degradable plastic.

In addition to the aromatic sensorial stimulation provided by rupturing the scent microcapsules encapsulated in the scent layer 130, the label 100 may be in the shape indicative of and/or carry a graphic image or marking indicative of its scent, e.g., an orange slice, a banana shape, a lime wedge, a watermelon slice, etc. The combination of aromatic and visual signals may trigger the sense of taste even when the beverage being consumed is flavorless, such as plain water, or otherwise does not include added flavoring associated with the perceived flavor attributed by the scent. As shown in FIGS. 1A-1D, in some instances the label 100 shown in FIGS. 1A-1D may be in the shape of a citrus slice, such as an orange slice, or other shape representative of its associated scent. In some examples, the label 100 may have a width W of between 2 cm and 10 cm, and a height H of between 1 cm and 5 cm, for example. In other examples, the label 100 may have a width W of between 3 cm and 6 cm, and a height H of between 2 cm and 4 cm, for example. In further examples, the label 100 may have a width W of between 2 cm and 3 cm, and a height H of between 1 cm and 2 cm, for example.

Figure 1B:
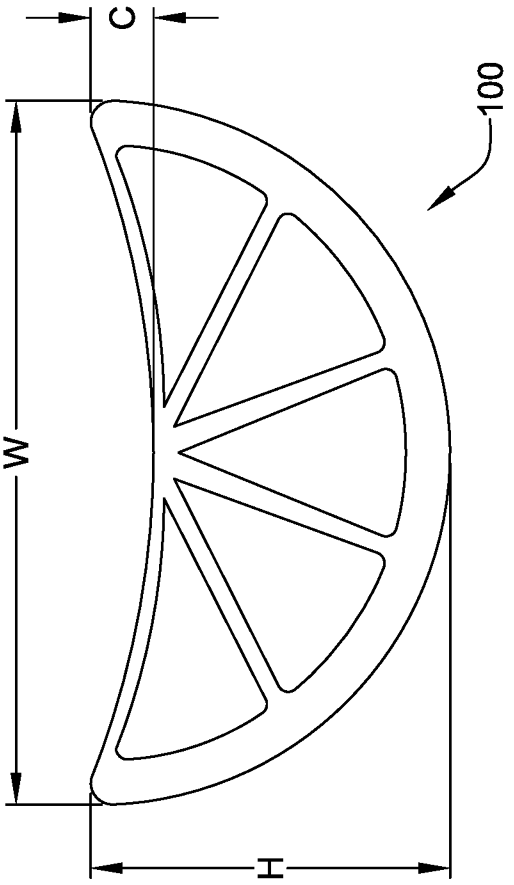
FIG. 1B is an illustration of another exemplary aromatic label.
Figure 1C:
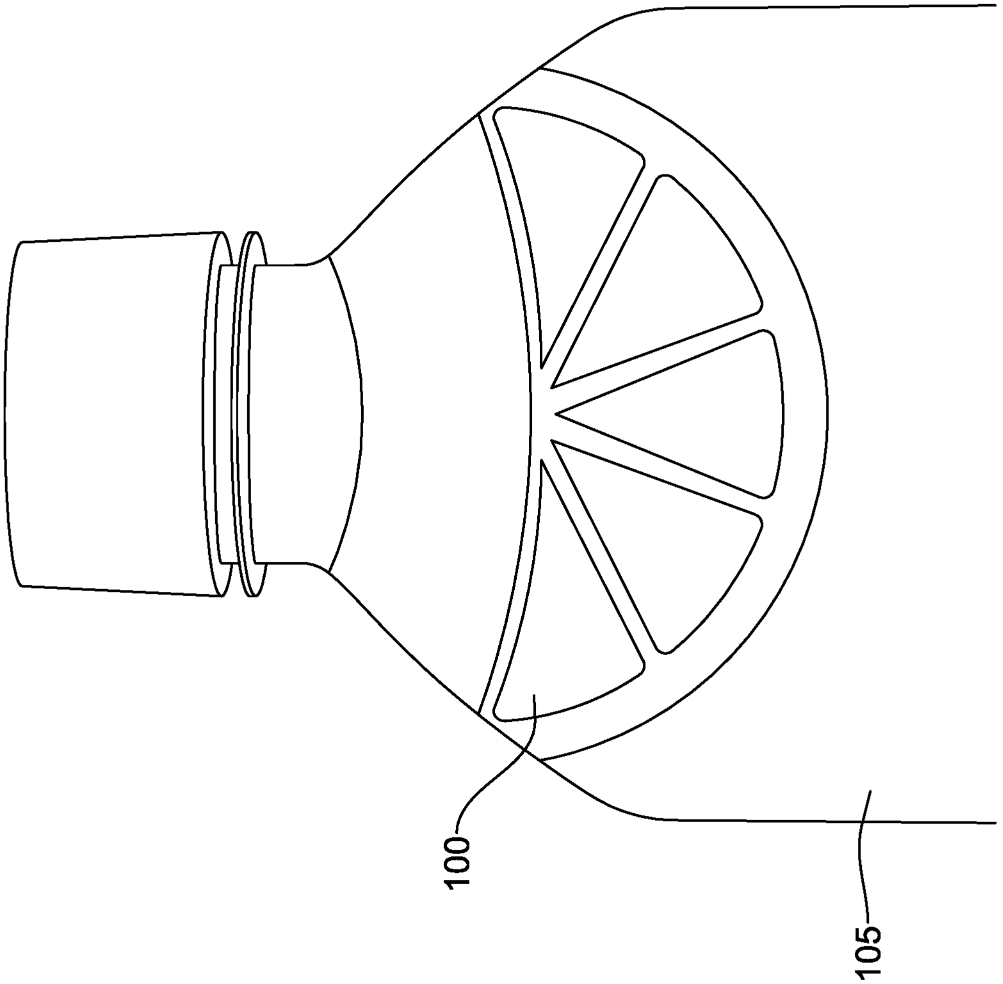
FIG. 1C is an illustration of the aromatic label of FIG. 1B disposed on a bottle.

In some instances, the label 100 may be sized and shaped to wrap around a portion of the circumference of the neck of a bottle 105, as shown in FIG. 1C. In this example, an example label 100 may have a width of 6 cm, a height of 2.5 cm, and may have a semi-circular cut-out C on the top edge of 1 cm, as shown in FIG. 1B. The concave edge may be configured to permit the label to at least partially circumferentially surround a frustoconical neck region of a beverage bottle and/or permit the label to be applied to an upper surface of a beverage can opposite the opening of the beverage can without obstructing the opening of the beverage can. For instance, the concave edge may permit the label to wrap around the frustoconical region of the neck of the bottle with reduced or no wrinkling, as shown in FIG. 1C. In other words, the cut-out portion may have a concave edge for extending around a smaller diameter portion of the frustoconical neck region of the bottle than the remainder of the label 100. For instance, the label 100 may include a concave upper edge positionable closer to the opening of the bottle, and a convex lower edge positionable further from the opening of the bottle. The convex lower edge may be positioned on an opposing edge of the label from the concave upper edge. This shape also mimics the contours of a citrus slice, as shown in FIG. 1B.

Figure 1D:
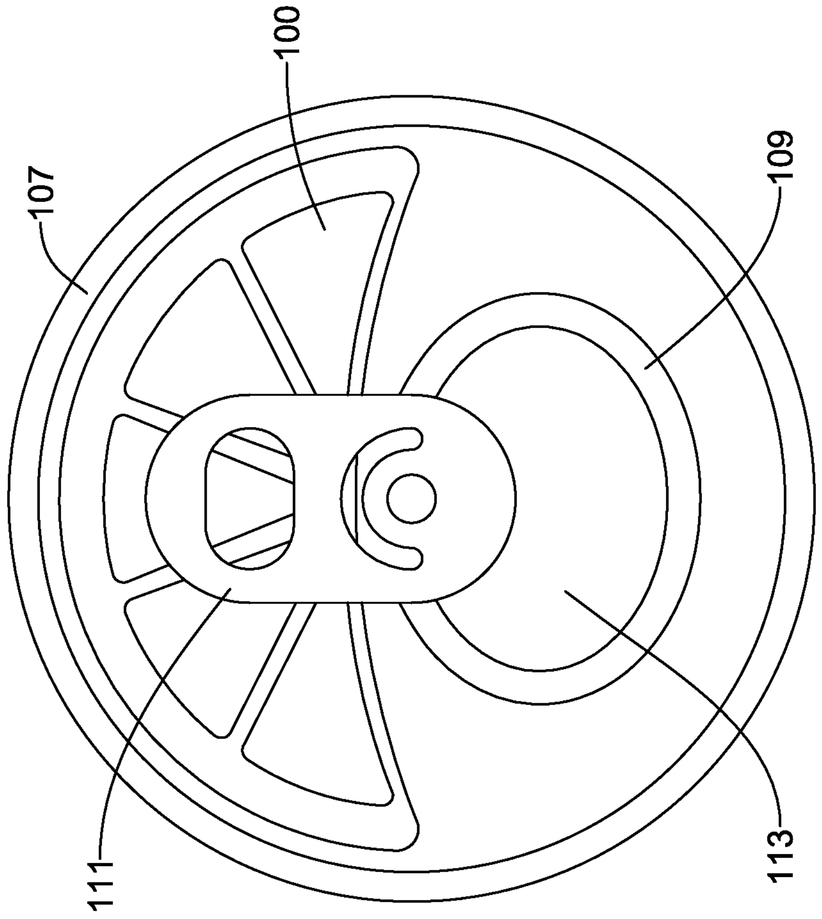
FIG. 1D is an illustration of the aromatic label of FIG. 1B disposed on a can.

When the label 100 is placed on an aluminum can 107, the label 100 may be placed on the top surface of the can 105, adjacent the opening 109. The semi-circular cut-out may accommodate a portion of the opening 109 of the can 105 with the concave edge curving around a portion of the opening 109. The opposite, convex edge of the label may follow the circumferential rim around the upper surface of the can 105. In some instances, the tab 111 for displacing the flap 113 into the interior of the can 107 to form the opening 109 may extend above the label 107 when the label 107 is attached to the top surface of the can 105, as shown in FIG. 1D. In other instances, the label 100 may be shaped to otherwise be attached proximate the opening 109. In order to provide an optimal olfactory sensation, in some instances the label 100 may be placed opposite the opening in order to place the label 100 in close proximity to the consumer's nose while drinking from the can 105.

The top surface of the substrate 120 may include a dye or other colorant to provide indicia (e.g., a word, marking or image) indicative of the scent contained in the scent layer 130 deposited thereon. In this example, the scent layer 130 may be devoid of any dye or colorant, and may be deposited in an even layer over the substrate 120, allowing the indicia of the backing layer 120 to be visible through the scent layer 130. In other examples, a constituent part of the scent layer 130 (e.g., the scent microcapsules and/or substrate) may include a colorant such as a food grade dye which may be deposited on the substrate 120 in a pattern or arrangement. In some examples, the pattern or arrangement may be representative of the scent of the aromatic material in the scent layer 130. In some examples, the pattern or arrangement may be a word, phrase, or marking indicative of the scent. In other examples, the pattern or arrangement may be an image or icon indicative of the scent. For example, as shown in FIGS. 1A and 1B, the scent layer 130 may be deposited on the substrate 120 in a fashion to depict the shape of a citrus slice. The coloration of the scent layer 130 may be selected according to the scent contained in the scent layer 130, such as orange for orange, yellow for lemon, green for lime, and pink for grapefruit, for instance. The use of visual indicia to represent the scent may allow the labels 100 to be universally used in any country, regardless of the language spoken. In the example shown in FIGS. 1A and 1B, the entire label 100 has the shape of a citrus slice. In other examples, the label may be a generic geometric shape, such as a square, rectangle, circle, oval, etc., and the indicia indicative of the scent may be created by the deposited scent layer 130 or a dye printed on the substrate 120.

The label 100 provides an aromatic stimulation, and in some cases, a visual stimulation, such that the consumer senses a flavor when drinking from a container having the label affixed thereto, even when the beverage in the container is devoid of the flavor. The aromatic substance in the scent layer 130, and any visual indicia on the label 100 are unrelated to an actual flavoring of the beverage in the container. This is in contrast to many product labels in which an image on the label shows the consumer what is in the container, such as an image of an orange on a carton of orange juice.

The labels 100 may be provided in a variety of ways. For example, a single label 100 may be provided with a removable backing layer, not shown, covering the adhesive on the bottom side of the substrate 120. The backing layer may have a release coating that prevents the adhesive from sticking permanently to the backing layer. The backing layer may shield the adhesive from inadvertent contact with another structure. When desired to adhere the label 100 to a beverage container, the backing layer may be readily peeled off, or otherwise removed, from the substrate 120 to expose the adhesive. The labels 100 may be individually packaged, or a plurality of labels 100 may be packaged together.

In other instances, a plurality of labels 100 may be arranged on a backing sheet. For example, a plurality of labels 100 may be arranged in a rectangular array or in a strip on a backing sheet covering the adhesive on the bottom side of the substrates 120. The backing sheet may have a release coating that prevents the adhesive from sticking permanently to the backing sheet. The backing sheet may shield the adhesive from inadvertent contact with another structure. When desired to adhere a label 100 to a beverage container, a label 100 may be peeled off of the backing sheet, or otherwise removed, from the backing sheet to expose the adhesive.

In some instances, the labels 100, such as an individual label 100 or a group of labels 100 (e.g., strip, booklet, roll, package, etc.) may be available for purchase at the point of sale of the beverage container. In other instances, the labels 100, such as a group of labels 100 (e.g., strip, booklet, roll, package, etc.), may be packaged with a case of beverage containers, such as within the cardboard or plastic packaging of a case of beverage containers for subsequent attachment to one or more of the beverage containers by the consumer, as desired. In some instances, a group of labels 100 (e.g., strip, booklet, roll, package, etc.) included with the case of beverage containers may include an assortment of different scents, allowing the consumer to select label with a desired scent, and thus perceived flavor, for attachment to a beverage container to be consumed. In other instances, a label 100 may be attached to each beverage container by the supplier and/or distributor of the beverage, such as at a station along the production line for filling the beverage container with a beverage.

Figure 2:
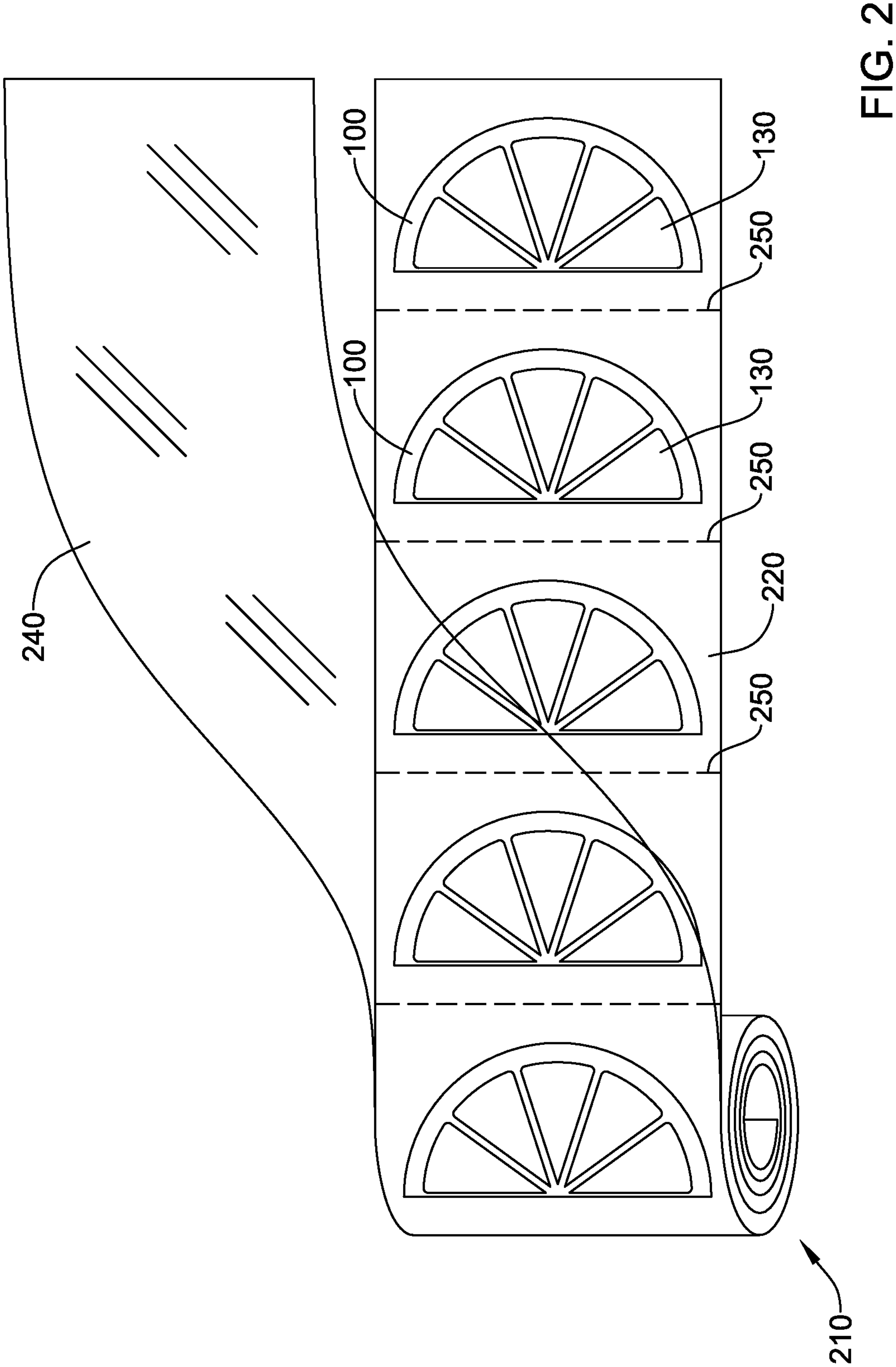
FIG. 2 is an illustration of an exemplary roll of aromatic labels with the cover partially removed.

FIG. 2 illustrates a roll 210 of labels 100 that may be individually affixed to a beverage container such as a bottle or can. In some instances, the roll 210 may be provided with a dispenser or may be adapted for use with a dispenser, if desired. The roll 210 includes an elongated continuous strip of material 220 rolled into a roll. In some instances, the continuous strip of material 220 may be the substrate 120 with or without a backing layer covering the adhesive on the bottom surface of the substrate 120. The scent layer 130, described above, may be disposed on the top surface of the substrate 120, i.e., the continuous strip of material 220 in this example. The scent layer 130 may cover the entire top surface of the continuous strip of material 220, or be disposed in discrete locations spaced apart from one another along the continuous strip of material 220. The roll 210 further includes a cover 240, such as the cover 140 discussed above, disposed over the scent layer 130 and the continuous strip of material 220, i.e., the substrate 120. The cover 240 may overlay and cover the entire top surface of the continuous strip of material 220 with the scent layer 130 therebetween, or the cover 240 may be disposed in discrete locations along the continuous strip of material 220 corresponding to discrete locations in which the scent layer 130 is disposed, such that the scent layer 130 is covered by the cover 240.

In some instances, the continuous strip of material 220 may include preferential tear lines 250 (e.g., perforations, thinned or weakened areas, etc.) extending across the continuous strip of material 220 between individual labels 100. Likewise, the cover 240 may include preferential tear lines (e.g., perforations, thinned or weakened areas, etc.) aligned with the preferential tear lines 250 of the continuous strip of material 220. In such instances, the label 100 may extend between adjacent preferential tears lines 250. In other instances, the continuous strip of material 220 and overlaying cover 240 may be readily torn or cut between individual labels 100, or otherwise define a label from a torn off portion of the continuous strip of material 220 to dispense a single label 100 or a subset of labels 100 from the roll 210.

In other instances, the continuous strip of material 220 may be a backing layer and a plurality of labels 100, each including a scent layer 130 disposed on a substrate 120 as described above, may be arranged along the continuous strip of material 220. The labels 100 may cover the entire top surface of the continuous strip of material 220, or be disposed in discrete locations spaced apart from one another along the continuous strip of material 220. Furthermore, the cover 240, such as the cover 140 discussed above, may be disposed over the scent layer 130 of the labels 100. The cover 240 may overlay and cover the entire top surface of the continuous strip of material 220 with the label 100 therebetween, or the cover 240 may be disposed in discrete locations along the continuous strip of material 220 corresponding to discrete locations in which the labels 100 are disposed, such that the scent layer 130 of each label 100 is covered by the cover 240. Removal of the cover 240 from the scent layer 130 of the label 100 creates a mechanical shear that ruptures the scent microcapsules, releasing the aromatic material within the scent microcapsules of the scent layer 130.

In some instances, the continuous strip of material 220 may include preferential tear lines 250 (e.g., perforations, thinned or weakened areas, etc.) extending across the continuous strip of material 220 between individual labels 100. Likewise, the cover 240 may include preferential tear lines (e.g., perforations, thinned or weakened areas, etc.) aligned with the preferential tear lines 250 of the continuous strip of material 220. In such instances, an individual label 100 may be positioned between adjacent preferential tears lines 250. In other instances, the continuous strip of material 220 and overlaying cover 240 may be readily torn or cut between individual labels 100 to dispense a single label 100 or a subset of labels 100 from the roll 210. When desired to adhere a label 100 to a beverage container, a label 100 may be torn or cut from the roll 210 and/or peeled off of the backing layer, i.e., underlying portion of the continuous strip of material 220, or otherwise removed, from the backing layer, i.e., the underlying portion of the continuous strip of material 220, to expose the adhesive of the label 100. Once the label 100 is applied to a beverage that is ready to be consumed, the cover 240 may be removed from the scent layer 130 of the label 100, creating a mechanical shear that ruptures the scent microcapsules, releasing the aromatic material within the scent microcapsules of the scent layer 130.

The roll 210 may allow the consumer to remove one label 100 at a time and affix it to a beverage container, including reusable glass, metal, or plastic bottles. This example may be provided at point of purchase in retail sales, allowing the consumer to purchase a roll 210 of aromatic labels 100 and any desired beverage container, or even use tap water or home filtered water with the labels 100 on a reusable container. The consumer simply applies the label 100 to the beverage container and removes the cover 240 overlying the scent layer 130 prior to use.

The roll 210 may include a large number of labels 100, such as 10, 20, 50, 100, 500, 1000, etc. and/or the roll 210 may be several feet in length, such as 2 feet or more, 5 feet or more, 8 feet or more, 10 feet or more, etc. In some instances, the roll 210 may include an assortment of labels 100 having different scents, allowing the consumer to select a label 100 with a desired scent, and thus perceived taste, for attachment to a beverage container to be consumed, or randomly dispensing a label 100 for the consumer. In other instances, each of the labels 100 on the roll 210 may be of the same scent.

Figure 3A:
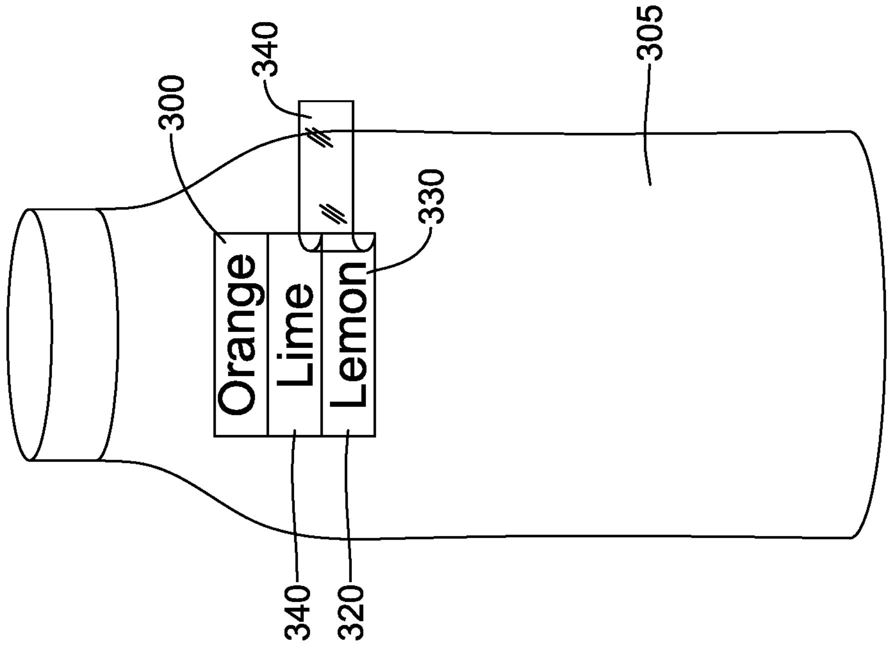
FIGS. 3A and 3B are illustrations of a bottle with exemplary aromatic labels.
Figure 3B:
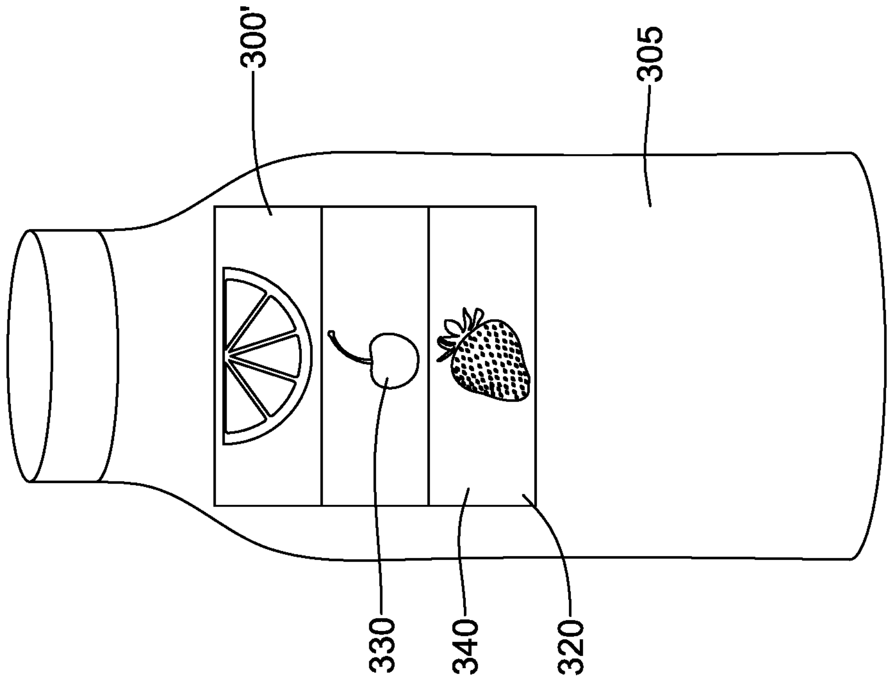

Another illustrative embodiment is a label permitting a consumer to select between a plurality of scents, and thus a plurality of perceived taste, for a beverage. FIGS. 3A and 3B illustrate containers 305 with labels 300, 300' having a plurality of regions where each region includes a scent layer containing scent microcapsules with a different scent. The labels 300, 300' may be placed on the container 305 adjacent the opening of the container in order to place the released scent close to the nose of the consumer while drinking. As in the label 100 described above, the labels 300, 300' may include a substrate 320 with an adhesive on a bottom surface thereof and a scent layer 330 with a plurality of scent microcapsules encapsulated in a membrane deposited on a top surface of the substrate 320. The label 300, 300' includes a removable cover 340 disposed over the scent layer. The cover 340 may be a clear layer allowing the consumer to view an underlying indicia indicative of the scent of a particular region of the label 300, 300'. The scent layer of the label 300, 300' may include a plurality of discrete regions, with the scent microcapsules of the scent layer in each region having a different scent. For example, in the example shown in FIG. 3A, the label 300 includes three regions, with the scent microcapsules of the scent layer in each region having a different scent. The removable cover 340 disposed over the top surface and covering the scent layer may include a first portion or panel covering the first region and thus covering the scent layer with a plurality of scent microcapsules of a first scent encapsulated in a membrane, a second portion or panel covering the second region and thus covering the scent layer with a plurality of scent microcapsules of a second scent encapsulated in a membrane, and a third portion or panel covering the third region and thus covering the scent layer with a plurality of scent microcapsules of a third scent encapsulated in a membrane. Each of the plurality of portions or panels of the cover 340 may be selectively and independently removed from the label 300, 300', thus uncovering the underlying scent layer and rupturing the corresponding scent microcapsules of a selected scent, while the remainder of the panels of the cover 340 remain over the remaining regions of the label 300, 300' having different scents. For instance, the first, second, and third portions of the removable cover 340 may be selectively and independently removable from the label 300, 300'. As with the cover 140 described above, removing one of the portions or panels of the removable cover 340 creates a mechanical shear force that ruptures the scent microcapsules in that particular region underneath, thereby releasing the aromatic material. The consumer may remove the panel of the cover 340 off of one region to release a single scent, as shown in FIG. 3A, or multiple regions in order to create a mixed aroma. Furthermore, in instances in which the beverage container is reusable or reused, a first panel of the removable cover 340 may be removed to release a first scent during a first usage of the container, a second panel of the removable cover 340 may be removed to release a second scent during a second, or subsequent usage of the container, and a third panel of the removable cover 340 may be removed to release a third scent during a third, or further usage of the container.

The substrate 320 may include a dye or other colorant that provides visual indicia (e.g., a word or image) indicative of the scent contained in the scent microcapsules of the scent layer 330 deposited thereon. In this example, the scent layer 330 may be devoid of any dye or colorant, and may be deposited in an even layer over the substrate 320. In other examples, the scent layer 330 may include a colorant such as a food grade dye, and the scent layer 330 may be deposited on the substrate 320 to provide visual indicia (e.g., a word or image) indicative of the scent of the associated scent layer 330. In the example shown in FIG. 3A, the indicia is a word indicating the scent associated with the particular discrete region of the label 300. As shown, the three regions of the label 300 indicate orange, lime, and lemon scent microcapsules are present in three distinct regions of the scent layer 330 on the label 300, with the cover 340 partially removed from the lemon region. In addition to the word, the indicia may include different colors also representing the scent, with the word "orange" written in orange color, "lime" written in green, and "lemon" written in yellow, for example. In the example shown in FIG. 3B, the indicia is an image or icon indicative of the scent associated with the particular discrete region of the label 300'. As shown, the label 300' includes three regions, with images depicting an orange, a cherry, and a strawberry to indicate the associated orange, cherry and strawberry scent microcapsules in the particular discrete region of the scent layer 330 of the label 300'. The images may be provided in color, with the orange slice in orange, the cherry in red, and the strawberry in lighter red or pink, for example. In other examples, the label 300, 300' may include a combination of words and images, such as only images for some regions and only words for other regions, or both words and images for some regions, if desired.

Figure 4A:
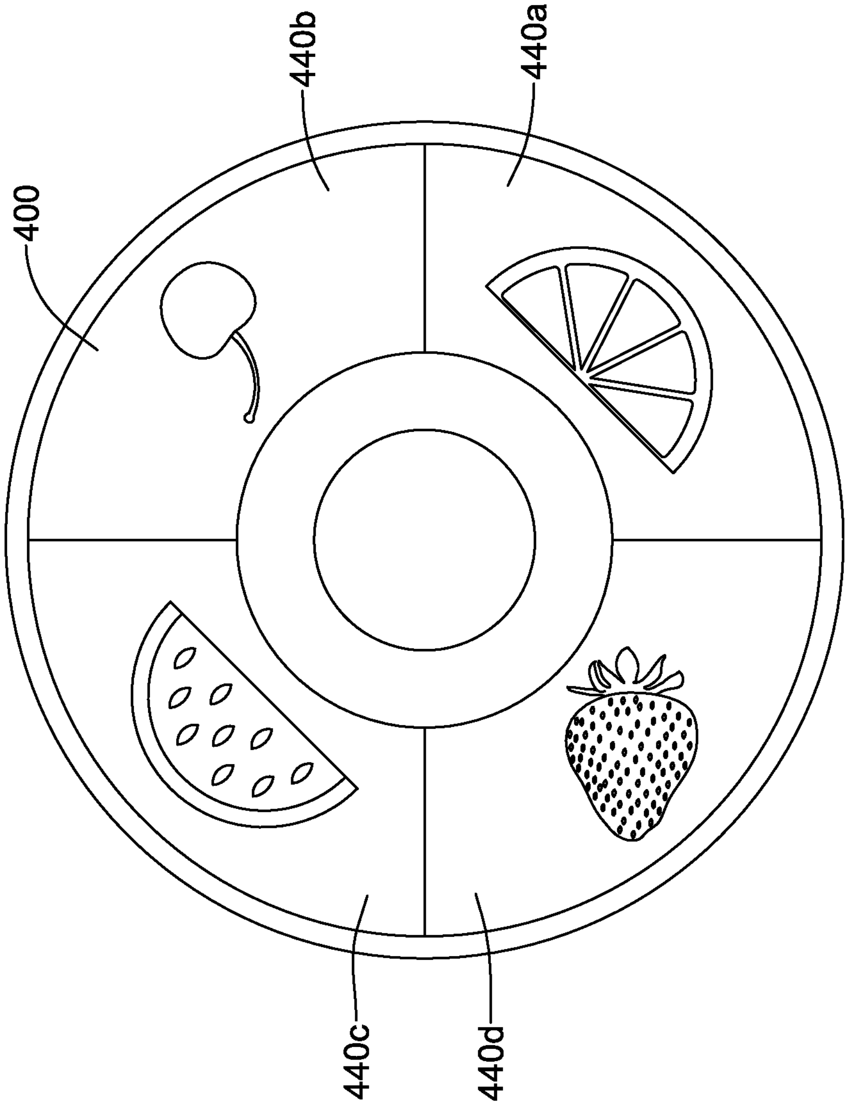
FIG. 4A is an illustration of an exemplary circular aromatic label.
Figure 4B:
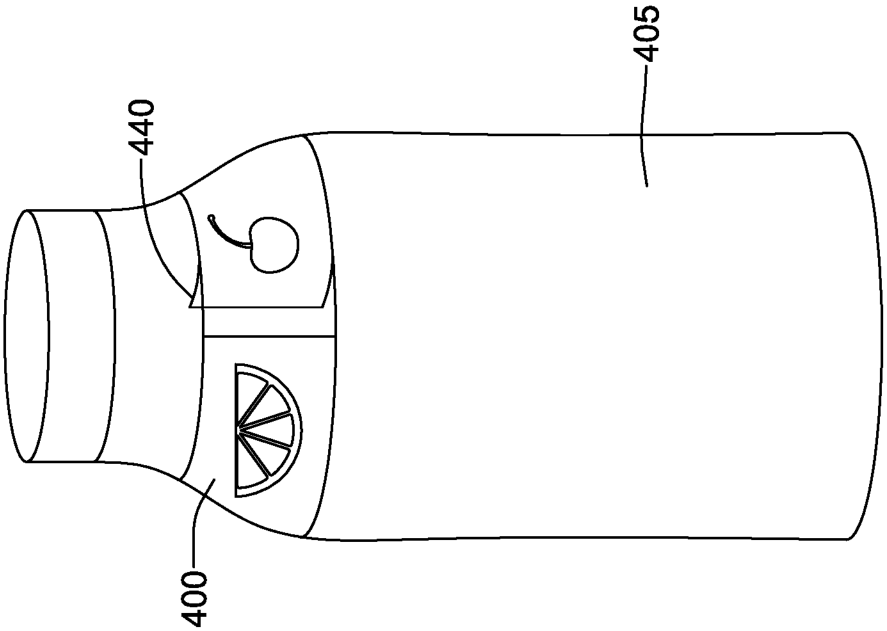
FIG. 4B is an illustration of the aromatic label of FIG. 4A disposed on a bottle.

The label 100, 300, 300' may be positioned on a beverage container in an orientation to place the scent microcapsules close to opening of the container such that the nose of the consumer is positioned in close proximity to the label 100, 300, 300' to permit the consumer to smell the scent as he or she drinks from the container. As shown in FIGS. 3A and 3B, the label 300, 300' may be disposed on one side of the bottle 305 adjacent the opening. In other examples, the label 400 may be annular, as shown in FIG. 4A, and may extend around the circumference of the opening of the bottle 405, as shown in FIG. 4B.

The label 400, similar to the labels 300, 300', may include a plurality of regions where each region includes a scent layer containing scent microcapsules with a different scent. As in the labels 300, 300' described above, the label 400 may include a substrate with an adhesive on a bottom surface thereof and a scent layer with a plurality of scent microcapsules encapsulated in a membrane deposited on a top surface of the substrate. The label 400 includes a removable cover 440 disposed over the scent layer. The cover 440 may be a clear layer allowing the consumer to view an underlying indicia indicative of the scent of a particular region of the label 400. The scent layer of the label 400 may include a plurality of discrete regions circumferentially arranged around a circumference of the label 400, with the scent microcapsules of the scent layer in each region having a different scent. For example, in the example shown in FIG. 4A, the label 400 includes four regions, with the scent microcapsules of the scent layer in each region having a different scent. The removable cover 440 disposed over the top surface and covering the scent layer may include a first portion or panel 440*a* covering the first region and thus covering the scent layer with a plurality of scent microcapsules of a first scent encapsulated in a membrane, a second portion or panel 440*b* covering the second region and thus covering the scent layer with a plurality of scent microcapsules of a second scent encapsulated in a membrane, a third portion or panel 440*c* covering the third region and thus covering the scent layer with a plurality of scent microcapsules of a third scent encapsulated in a membrane, and a fourth portion or panel 440*d* covering the fourth region and thus covering the scent layer with a plurality of scent microcapsules of a fourth scent encapsulated in a membrane. The label 400 may include more or fewer regions of discrete scents as desired. Each of the plurality of portions or panels of the cover 440 may be selectively and independently removed from the label 400, thus uncovering the underlying scent layer and rupturing the corresponding scent microcapsules of a selected scent, while the remainder of the panels of the cover 440 remain over the remaining regions of the label 400 having different scents. For instance, each of the first, second, third and fourth portions or panels of the removable cover 440 may be selectively and independently removable from the label 400 without disrupting the remainder of the panels of the cover 440. As with the cover 140 described above, removing one of the portions or panels of the removable cover 440 creates a mechanical shear force that ruptures the scent microcapsules in that particular region underneath, thereby releasing the aromatic material. The consumer may remove the panel of the cover 440 off of one region to release a single scent, as shown in FIG. 4B, or multiple regions in order to create a mixed aroma. Furthermore, in instances in which the beverage container is reusable or reused, a first panel 440*a* of the removable cover 440 may be removed to release a first scent during a first usage of the container, a second panel 440*b* of the removable cover 440 may be removed to release a second scent during a second, or additional usage of the container, a third panel 440*c* of the removable cover 340 may be removed to release a third scent during a third, or subsequent usage of the container, and a fourth panel 440*d* of the removable cover 340 may be removed to release a fourth scent during a fourth, or further usage of the container.

Figure 5:
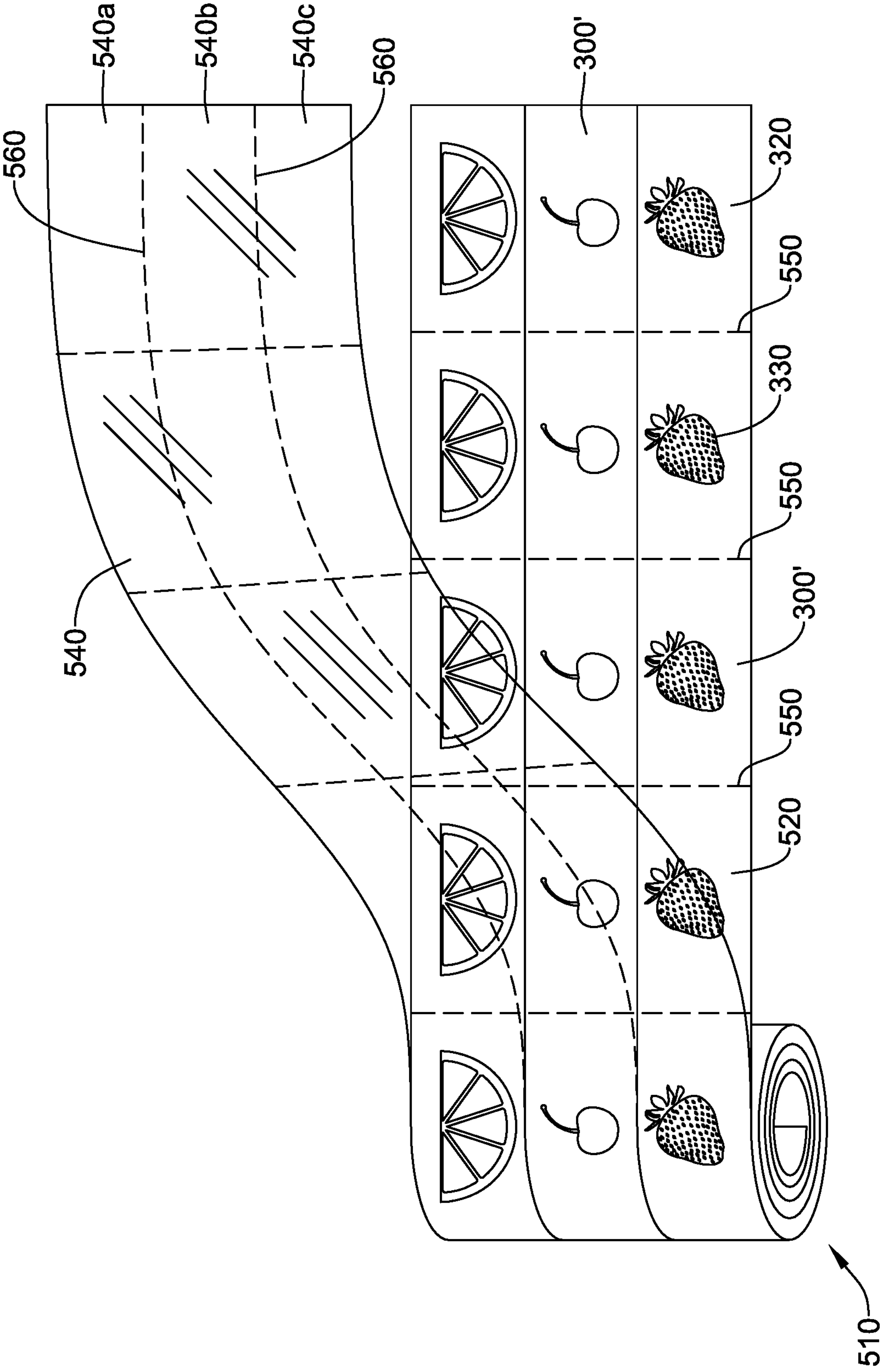
FIG. 5 is an illustration of another exemplary roll of aromatic labels with the cover partially removed.

FIG. 5 illustrates a roll 510 of labels 300' that may be individually affixed to a beverage container such as a bottle or can. In some instances, the roll 510 may be provided with a dispenser or may be adapted for use with a dispenser, if desired. The roll 510 includes an elongated continuous strip of material 520 rolled into a roll. In some instances, the continuous strip of material 520 may be the substrate 320 with or without a backing layer covering the adhesive on the bottom surface of the substrate 320. The scent layer 330, described above, may be disposed on the top surface of the substrate 320, in a plurality of discrete longitudinal strips running continuously or discontinuously along the length of the continuous strip of material 520. Each of the plurality of discrete longitudinal strips of the scent layer 330 may provide a discrete scent region (e.g., having scent microcapsules of different scents) having a different scent from adjacent strips of the scent layer 330. The roll 510 further includes a cover 540, such as the cover 140 discussed above, disposed over the scent layer 330 and the continuous strip of material 520, i.e., the substrate 320. The cover 540 may overlay and cover the entire top surface of the continuous strip of material 520 with the scent layer 330 therebetween, or the cover 540 may be disposed in discrete locations along the continuous strip of material 520 corresponding to discrete locations in which the scent layer 330 is disposed, such that the scent layer 330 is covered by the cover 540.

In other instances, the continuous strip of material 520 may be a backing layer and a plurality of labels 300', each including a scent layer 330 having plurality of discrete longitudinal strips of the scent layer 330 providing a plurality of discrete scent regions (e.g., having scent microcapsules of different scents) having a different scent from adjacent strips of the scent layer 330 disposed on a substrate 320 as described above, may be arranged along the continuous strip of material 520. The labels 300' may cover the entire top surface of the continuous strip of material 520, or be disposed in discrete locations spaced apart from one another along the continuous strip of material 520. Furthermore, the cover 540, such as the cover 140 discussed above, may be disposed over the scent layer 330 of the labels 300'. The cover 540 may overlay and cover the entire top surface of the continuous strip of material 520 with the label 300' therebetween, or the cover 540 may be disposed in discrete locations along the continuous strip of material 520 corresponding to discrete locations in which the labels 300' are disposed, such that the scent layer 330 of each label 300' is covered by the cover 540.

In some instances, the continuous strip of material 520 may include preferential tear lines 550 (e.g., perforations, thinned or weakened areas, etc.) extending across the continuous strip of material 520 between individual labels 300'. Likewise, the cover 540 may include preferential tear lines (e.g., perforations, thinned or weakened areas, etc.) aligned with the preferential tear lines 550 of the continuous strip of material 520. In such instances, the label 300' may extend between adjacent preferential tears lines 550. In other instances, the continuous strip of material 520 and overlaying cover 540 may be readily torn or cut to form individual labels 300' from the roll 510. Furthermore, the cover 540 may be cut or scored longitudinally to provide the cover 540 with a plurality of discrete panels, with a separately removable panel overlying each of the plurality of discrete scent regions of the scent layer 330. Longitudinal scores or cuts 560 are shown in FIG. 5 to define a first panel 540*a*, a second panel 540*b*, and a third panel 540*c* of the cover 540 overlying a label 300'. Thus, a select panel of the cover 540 may be removed from a label 300' to expose a selected scent region while the remainder of the cover 540 may remain intact on the label 300'.

When desired to adhere a label 300' to a beverage container, a label 300' may be torn or cut from the roll 510 and/or peeled off of the backing layer, i.e., underlying portion of the continuous strip of material 520, or otherwise removed, from the backing layer to expose the adhesive of the label 300'. Once the label 300' is applied to a beverage that is ready to be consumed, the desired panel of the cover 540 may be removed from underlying region of the scent layer 330 of the label 300, creating a mechanical shear that ruptures the scent microcapsules of the selected region of the scent layer 330, releasing the aromatic material within the scent microcapsules of the selected region of the scent layer 330.

The roll 510 may allow the consumer to remove one label 300' at a time and affix it to a beverage container, including reusable glass, metal, or plastic bottles. This example may be provided at point of purchase in retail sales, allowing the consumer to purchase a roll 510 of aromatic labels 300' and any desired beverage container, or even use tap water or home filtered water with the labels 300' on a reusable container. The label 300' further provide the consumer with the option of selecting from a multiplicity of scents as desired. The consumer simply applies the label 300' to the beverage container and removes the panel of the cover 540 overlying the desired region of the scent layer 330 having the desired scent prior to use.

The roll 510 may include a large number of labels 100, such as 10, 20, 50, 100, 500, 1000, etc. and/or the roll 510 may be several feet in length, such as 2 feet or more, 5 feet or more, 8 feet or more, 10 feet or more, etc.

In addition to beverage containers, the labels 100, 300, 300', 400 described above may be placed on other containers and packages whenever an aroma is desired to be associated with consumption of the food or beverage within the container.

An alternative to the pre-scented labels discussed above is applying an aroma solution onto an absorbent label and then adhering the absorbent label to a beverage container such as a bottle, can, pouch, coated paper box, etc., just prior to consumption. The aroma solution may be used to enhance any beverage, including plain water, soda, juice, beer, alcohol, etc.

Figure 6A:
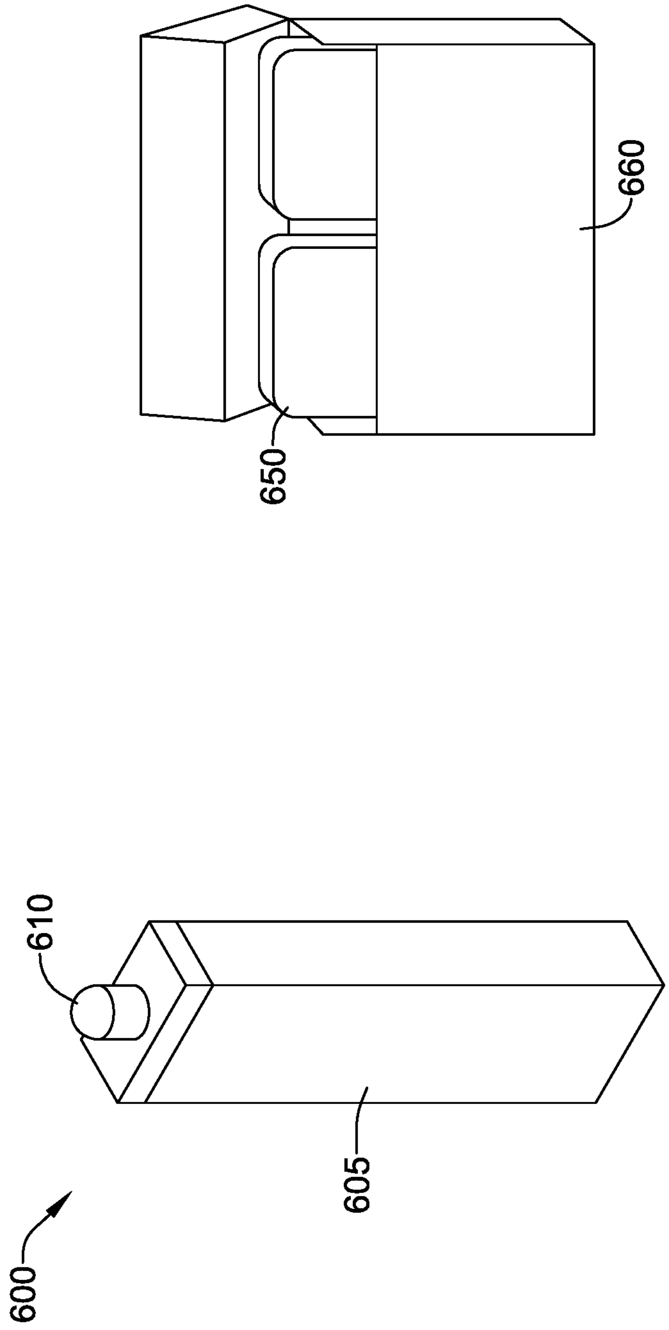
FIG. 6A is an illustration of an exemplary aroma dispensing assembly.

FIG. 6A illustrates an embodiment of an aroma dispensing assembly or kit for providing an aroma to a beverage container. The assembly allows the consumer to select an aroma and provide that aroma to their container, such as a bottle, can, or glass of beverage such as plain water immediately prior to drinking. The assembly includes a container 600 of aroma solution and a plurality of absorbent labels 650. The plurality of absorbent labels 650 may be held in a receptacle 660 such as a box, envelope, sleeve, etc. The container 600 may include a reservoir 605 configured to hold the aroma solution and a dispenser 610 for dispensing the aroma solution from the reservoir 605. In some examples, the dispenser 610 may be a rollerball as shown in FIG. 6A. In other examples, the dispenser 610 may be a spray nozzle, dropper, sponge, or other element configured to dispense a solution. In some examples, the dispenser 610 may be configured to dispense a pre-determined volume of aroma solution. For example, a spray nozzle may be configured to dispense a pre-determined volume of aroma solution each time the spray nozzle is depressed.

Figure 6B:
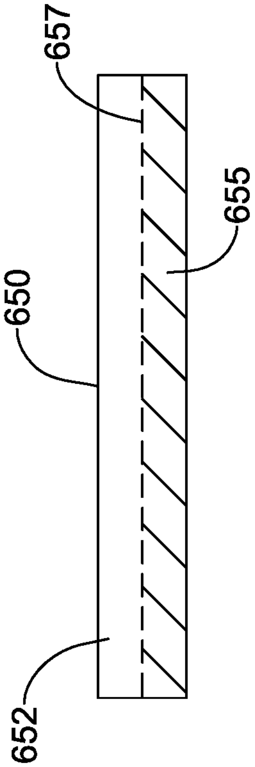
FIG. 6B is a cross-sectional view of an exemplary absorbent label.

Each of the absorbent labels 650 may have a first side 652 configured to absorb the aroma solution and a second, opposite, side including an adhesive 655, as shown in FIG. 6B. The adhesive may be pressure-sensitive and/or repositionable. In some embodiments, the absorbent labels 650 may include a liquid impermeable barrier 657 between the absorbent first side 652 and the adhesive 655 on the second side. The liquid impermeable barrier 657 may prevent the aroma solution from contacting the adhesive 655.

Unflavored still (non-carbonated) or carbonated beverages such as water may be provided in a beverage container, such as bottles (e.g., glass or plastic bottles) or aluminum cans. The absorbent labels 650 may be shaped to conform to the surface of the bottle or can adjacent the opening of the container. For cans, the absorbent labels 650 may be shaped like the label 100 illustrated in FIGS. 1B and 1D, with a first curved edge configured to fit around the opening and a second curved edge configured to match the curvature of the outer circular edge of the top surface of an aluminum can. The same shape of absorbent label 650 may be used on bottles, as shown in FIG. 1C.

The aroma may be provided in the form of one or more essential oils. In some examples, the aroma solution may include propylene glycol. In other examples, the aroma solution may include alcohol.

Figure 7:
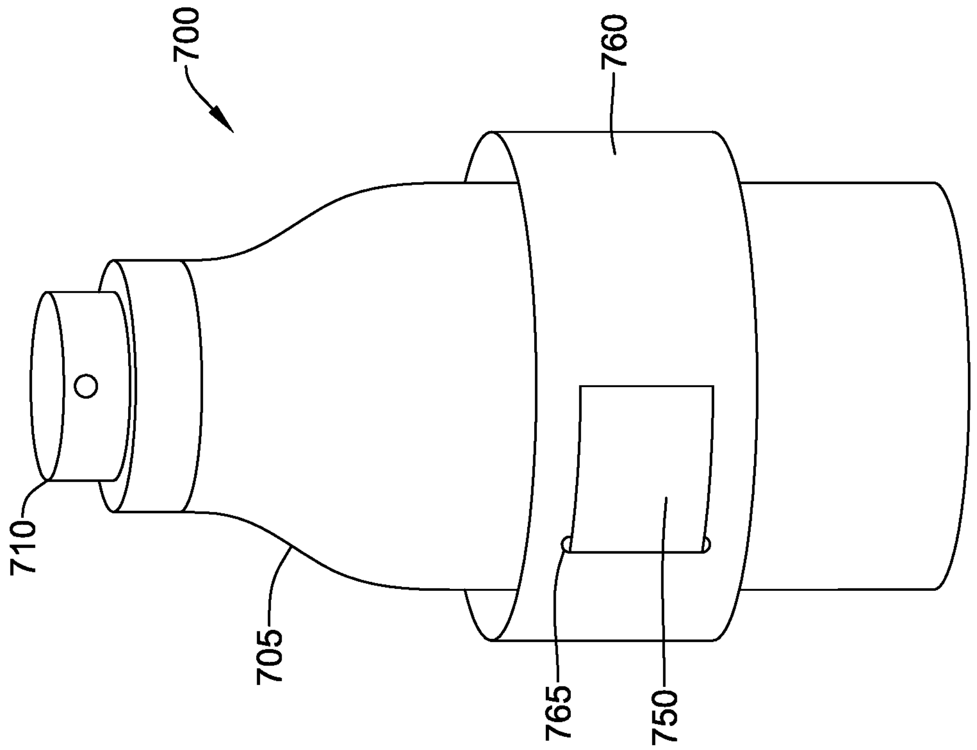
FIG. 7 is an illustration of an exemplary container of aroma solution with attached label dispenser.

In some instances, the receptacle 660 of absorbent labels 650 may be separate from the container 605. However, in other instances, the receptacle 660 may be combined with and/or attached to the container 605. For example, as shown in FIG. 7, in some examples, the aroma dispensing assembly 700 may include a receptacle 760 for holding the absorbent labels 750 that is provided with or otherwise attached to the container 705 holding the aroma solution. As illustrated in FIG. 7, the container 705 is a bottle with a spray nozzle dispenser 710 and the receptacle 760 is combined with or otherwise attached to the container 705. For example, the receptacle 760 may encircle the bottle 705. The receptacle 760 as illustrated has a slot 765 through which the labels 750 are dispensed one at a time. The plurality of labels 750 may be adhered to each other such that a first label extends through the slot 765 and when the first label 750 is pulled out the second label is pulled partially through the slot as the first label is separated from the second label. In other examples, the plurality of labels 750 may be provided as a roll with perforations between each label and/or provided with a severing mechanism to detach a portion of the roll from the remainder of the roll. The roll of labels 750 may extend circumferentially around the bottle 705, and each label may be ripped from the roll for use. The labels are thus dispensed one at a time. In other examples, the receptacle may be in the form of a box or sleeve that is attached to a container but does not extend circumferentially around the container, similar to the receptacle 660 shown in FIG. 6A.

Figure 8:
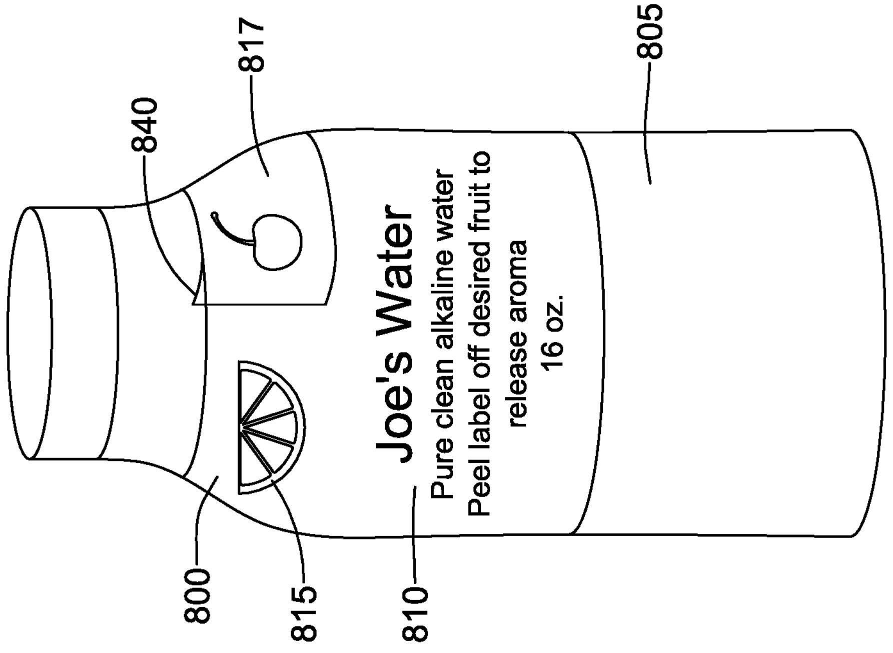
FIG. 8 is an illustration of a bottle with an exemplary combination aromatic label.

Another illustrative embodiment is a combination label 810 that includes at least one scent region 815 on the product identification label 810. FIG. 8 illustrates a container 805 with a combination label 810 that provides the product identification information in addition to at least one scent region 815 including scent microcapsules. The product identification information may include, but is not limited to, the brand name, ingredients, source, and volume. The product identification information on the label 810 may include additional information and/or indicia, such as a bar code, QR code, advertising, distribution information, packaging information, etc. The label 810 may also include instructions for activating the aroma label. The scent region 815 may be printed directly on the product identification label 810. In other examples, a scent label may be affixed to the product information label.

In the example illustrated in FIG. 8, the label incudes multiple scent regions, such as a first scent region 815 configured to provide a first scent and a second scent region 817 configured to provide a second scent. The first scent may be the same as or different than the second scent. The first scent region 815 is illustrated with a first image or indicia representative of the first scent (e.g., a citrus image) and the second region 817 is illustrated with a second image or indicia representative of the second scent (e.g., a cherry image). The label 800 may be placed on the container 805 such that the first and second scent regions 815, 817 are adjacent the opening of the container in order to place the released scent close to the nose of the consumer while drinking. As in the labels 100, 300, 300' described above, the first and second scent regions 815, 817 of label 800 may each include a scent layer with a plurality of scent microcapsules encapsulated in a membrane deposited on a top surface of the label substrate. The first and second scent regions 815, 817 may include a removable cover 840 disposed over the scent layer. The cover 840 may be a clear layer allowing the consumer to view an underlying indicia indicative of the scent of a particular region of the label 800, such as the fruit images seen in FIG. 8. In other examples, a word naming the scent is used instead of or in addition to the fruit image. The removable cover 840 disposed over the top surface and covering the scent layer may include a first portion or panel covering the first region 815, and a second portion or panel covering the second region 817. Each of the plurality of portions or panels of the cover 840 may be selectively and independently removed from the label 800, thus uncovering the underlying scent layer and rupturing the corresponding scent microcapsules of a selected scent, while the remainder of the panels of the cover 840 remain over the remaining regions of the label 800 having different scents. As discussed above with regard to the labels 300, 300', the consumer may remove the panel of the cover 840 off of one region to release a single scent, or multiple regions in order to create a mixed aroma.

The label 100, 300, 300', 800 may be positioned on a beverage container in an orientation to place the scent microcapsules close to opening of the container such that the nose of the consumer is positioned in close proximity to the label 100, 300, 300', 800 to permit the consumer to smell the scent as he or she drinks from the container. As shown in FIG. 8, the label 800 may be annular, and may extend around the circumference of the opening of the bottle 805.

The aroma dispensing assemblies described above may be used to enhance a container of plain, unflavored still or carbonated beverage such as water. The consumer may apply the aroma solution to the absorbent surface of one of the labels and then adhere the label to a container of beverage such that the absorbent surface is placed in close proximity to the consumer's nose while the consumer drinks from the container. The label is generally adhered to the container such that it will not contact the consumer's mouth while drinking from the container. The aroma solution may be sprayed onto the absorbent surface of the label from a spray bottle, rolled onto the label using a rollerball dispenser, or one or more drops of aroma solution may be deposited onto the label using a dropper. The aroma solution may be deposited onto the absorbent label either before or after the label is applied to the beverage container. Applying the aroma solution to the label before the label is affixed to the beverage container may prevent any aroma solution from being deposited onto the opening where the consumer's mouth with come into direct contact with it. This may be advantageous particularly if the aroma solution has a bitter or unpleasant taste.

The above detailed description includes references to the accompanying drawings, which form a part of the detailed description. The drawings show, by way of illustration, specific embodiments in which the invention can be practiced. These embodiments may also referred to herein as "examples." Such examples can include elements in addition to those shown or described. However, the present inventor also contemplates examples in which only those elements shown or described are provided. Moreover, the present inventor also contemplates examples using any combination or permutation of those to elements shown or described (or one or more aspects thereof), either with respect to a particular example (or one or more aspects thereof), or with respect to other examples (or one or more aspects thereof) shown or described herein.

Various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A scent enhanced beverage container, comprising:

a container configured to hold a beverage, the container having an opening for drinking the beverage therefrom; and an aromatic label disposed on the container, adjacent the opening such that the aromatic label is positioned in close proximity to a consumer's nose when the consumer drinks from the container, the aromatic label further including:

a substrate affixed to a surface of the container, a scent layer disposed on the substrate, the scent layer including a first scent region containing a plurality of scent microcapsules having a first scent, wherein the plurality of scent microcapsules each comprises an aromatic substance surrounded by a polymer shell, and a removable cover disposed over the scent layer, the removable cover configured such that removal of the removable cover ruptures the polymer shells of the scent microcapsules and releases the scent, wherein the aromatic substance is prevented from being released by rubbing or scratching the label.

2. The scent enhanced beverage container of claim 1, wherein the aromatic label is an annular label extending circumferentially around the container.

3. The scent enhanced beverage container of claim 2, wherein the annular label extends circumferentially around a frustoconical neck region of the container.

4. The scent enhanced beverage container of claim 1, wherein the removable cover is formed of a cellulose based material.

5. The scent enhanced beverage container of claim 1, wherein the aromatic label includes product identification information, wherein the product identification information includes a bar code or QR code.

6. The scent enhanced beverage container of claim 1, wherein the aromatic label includes product identification information, wherein the product identification information includes ingredients.

7. The scent enhanced beverage container of claim 1, wherein the aromatic label includes product identification information, wherein the product identification information includes instructions for activating the aromatic label.

8. The scent enhanced beverage container of claim 1, wherein the aromatic label includes product identification information, wherein the product identification information includes a brand name, a volume of fluid in the container, and a bar code.

9. The scent enhanced beverage container of claim 8, wherein the product identification information further includes instructions for activating the aromatic label.

10. The scent enhanced beverage container of claim 8, wherein the product identification information further includes ingredients.

11. The scent enhanced beverage container of claim 10, wherein the product identification information further includes instructions for activating the aromatic label.

12. The scent enhanced beverage container of claim 1, wherein the first scent region includes first indicia indicative of the first scent and/or a first colorant indicative of the first scent.

13. The scent enhanced beverage container of claim 1, wherein the scent layer includes a second, discrete scent region containing a plurality of scent microcapsules having a second scent different from the first scent.

14. The scent enhanced beverage container of claim 13, wherein the removable cover includes a first panel covering the first region and a second panel covering the second scent region, the first panel of the removable cover being selectively and independently removable from the first scent region of the scent layer to release the first scent while the second scent region remains covered by the second panel.

15. The scent enhanced beverage container of claim 14, wherein the removable cover includes a cut or score line between the first panel and the second panel.

16. The scent enhanced beverage container of claim 13, wherein the first scent region includes first indicia indicative of the first scent and the second scent region includes second indicia indicative of the second scent, the first indicia being different from the second indicia.

17. The scent enhanced beverage container of claim 13, wherein the first scent region includes a first colorant indicative of the first scent and the second scent region includes a second colorant indicative of the second scent, the second colorant being different from the first colorant.

18. A scent enhanced beverage container, comprising:

a container configured to hold a beverage, the container having an opening for drinking the beverage therefrom; and an annular aromatic label extending circumferentially around the container, the aromatic label including a brand name, a volume of fluid in the container, and a bar code, the aromatic label further including:

a substrate affixed to a surface of the container, a scent layer disposed on the substrate, the scent layer including a first scent region containing a plurality of scent microcapsules having a first scent wherein the plurality of scent microcapsules each comprises an aromatic substance surrounded by a polymer shell, a removable cover disposed over the scent layer, the removable cover configured such that removal of the removable cover ruptures the polymer shells of the scent microcapsules and releases the scent to activate the aromatic label, wherein the aromatic substance is prevented from being released by rubbing or scratching the label; and instructions for activating the aromatic label;

wherein the aromatic label further includes a graphic image representing the aromatic substance in the plurality of scent microcapsules.

19. The scent enhanced beverage container of claim 18, wherein the aromatic label further includes ingredients.

20. The scent enhanced beverage container of claim 1, wherein the aromatic label has a crescent shaped outer periphery including an outer peripheral concave edge and an outer peripheral convex edge opposite the outer peripheral concave edge.

21. The scent enhanced beverage container of claim 1, wherein a remainder of the container that is not covered by the aromatic label, is devoid of the removable cover.

* * * * *